United States Patent
Cho

(10) Patent No.: US 8,495,599 B2
(45) Date of Patent: Jul. 23, 2013

(54) APPARATUS AND METHOD FOR POWER SAVING

(75) Inventor: Il-Hyun Cho, Seoul (KR)

(73) Assignee: Samsung Electronics Ltd., Co., Suwon-si (KR)

( * ) Notice: Subject to any disclaimer, the term of this patent is extended or adjusted under 35 U.S.C. 154(b) by 1225 days.

(21) Appl. No.: 12/258,137

(22) Filed: Oct. 24, 2008

(65) Prior Publication Data

US 2009/0113223 A1    Apr. 30, 2009

(30) Foreign Application Priority Data

Oct. 26, 2007    (KR) .................. 10-2007-0108111

(51) Int. Cl.
    *G06F 9/45*    (2006.01)
(52) U.S. Cl.
    USPC ............... 717/141; 717/127; 717/143

(58) Field of Classification Search
    None
    See application file for complete search history.

(56) References Cited

U.S. PATENT DOCUMENTS

2010/0293342 A1* 11/2010 Morfey et al. .............. 711/154

* cited by examiner

*Primary Examiner* — Chuck Kendall
(74) *Attorney, Agent, or Firm* — Jefferson IP Law, LLP

(57) ABSTRACT

An apparatus and method for power savings are provided. The apparatus includes a register analysis unit and a register change unit. The register analysis unit determines if registers among bit-switching targeted registers are one of changeable and unchangeable. The register change unit searches for a register pair having a minimum bit switching frequency among registers determined to be changeable, and changes at least one register.

18 Claims, 6 Drawing Sheets

APPARATUS AND METHOD FOR POWER SAVING

PRIORITY

This application claims the benefit under 35 U.S.C. §119(a) of a Korean patent application filed in the Korean Intellectual Property Office on Oct. 26, 2007 and assigned Serial No. 2007-0108111, the entire disclosure of which is hereby incorporated by reference

BACKGROUND OF THE INVENTION

1. Field of the Invention

The present invention relates to an apparatus and method for saving power in a system using a microprocessor. More particularly, the present invention relates to an apparatus and method for a software-oriented power saving technology for reducing power consumption by saving bit switching power in a system using a microprocessor.

2. Description of the Related Art

The significance of a low power design is continuously increasing as power consumption of mobile equipment increases due to faster data rates and the addition of supplementary functions.

At present, a hardware-oriented low power technology is mostly used at a chip level, but has limitations. A dynamic power in a Complementary Metal-Oxide Semiconductor (CMOS) integrated circuit can be given as Equation 1 below:

$$P_d = \alpha \times C \times V^2 \times f \quad (1)$$

Here, the '$\alpha$' denotes an activity rate representing an average frequency of transition, which consumes power, implemented by a node during a single clock period. The 'C' denotes a capacitive load upon switching. The 'V' denotes a supply voltage and the 'f' denotes a switching frequency.

In Equation 1, the dynamic power can be reduced through a reduction of the activity rate, the supply voltage, and the switching frequency. Among these, the reduction of the activity rate has a relation to bit switching within a register, and this can be implemented by software.

FIG. 1 is a diagram illustrating a principle of power optimization using a conventional bit switching.

Referring to FIG. 1, in performing any operation, a bit switching operation frequency can be reduced through a change of only a register. If a variation of registers before the change is equal to 'r1 (0001)→r14 (1110)→+r3 (0011)', bit switching of 7 bits takes place. However, if a variation of registers after the change is equal to 'r12 (1100)→r8 (1000)→r0 (0000)', that is, if r1 changes into r12, r14 changes into r8, and r3 changes into r0, bit switching is reduced to 2 bits.

If this principle is applied to all registers illustrated in FIG. 1, a sum of total bit switching reduces from 20 bits to 6 bits. However, upon a change of a register, it is required to investigate if the register is changeable based on several conditions.

FIG. 2 is a diagram illustrating a conventional bit switching optimization scheme.

There is a disadvantage in that the technology illustrated in FIG. 1 is applied only for a single code and a single function as illustrated in FIG. 2 because, when a register changes, there are the following limitations:

First, a register is changeable only when a register of each function has no influence on a register of other functions, and Second, a change of a register is limited depending on a compile mode. A register used for a specific purpose is difficult to change.

Thus, there is a demand for a scheme applicable to a global function and a global code by considering and addressing the above limitations.

SUMMARY OF THE INVENTION

An aspect of the present invention is to address at least the above-mentioned problems and/or disadvantages and to provide at least the advantages below. Accordingly, one aspect of the present invention is to provide an apparatus and method for power saving in a system using a microprocessor.

Another aspect of the present invention is to provide an apparatus and method for applying a change of a register to a global function and a global code.

A further aspect of the present invention is to provide an apparatus and method for providing a register change scheme applicable to a global function and a global code, thus achieving a power savings.

The above aspects are addressed by providing an apparatus and method for power saving in a system using a microprocessor.

According to one aspect of the present invention, an apparatus for reducing a bit switching frequency is provided. The apparatus includes a register analysis unit and a register change unit. The register analysis unit determines if registers among bit-switching targeted registers are one of changeable and unchangeable. The register change unit searches for a register pair having a minimum bit switching frequency among registers determined to be changeable, and changes at least one register.

According to another aspect of the present invention, a method for reducing a bit switching frequency is provided. The method includes determining if registers among bit-switching targeted registers are one of changeable and unchangeable, searching a register pair having a minimum bit switching frequency among the one or more registers determined to be changeable, and changing at least one register.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description when taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

In the following description, it is to be understood that the singular forms "a," "an," and "the" include plural referents unless the context clearly dictates otherwise. Thus, for example, reference to "a component surface" includes reference to one or more of such surfaces.

An apparatus and method for power saving according to exemplary embodiments of the present invention are described below.

Figure 1:
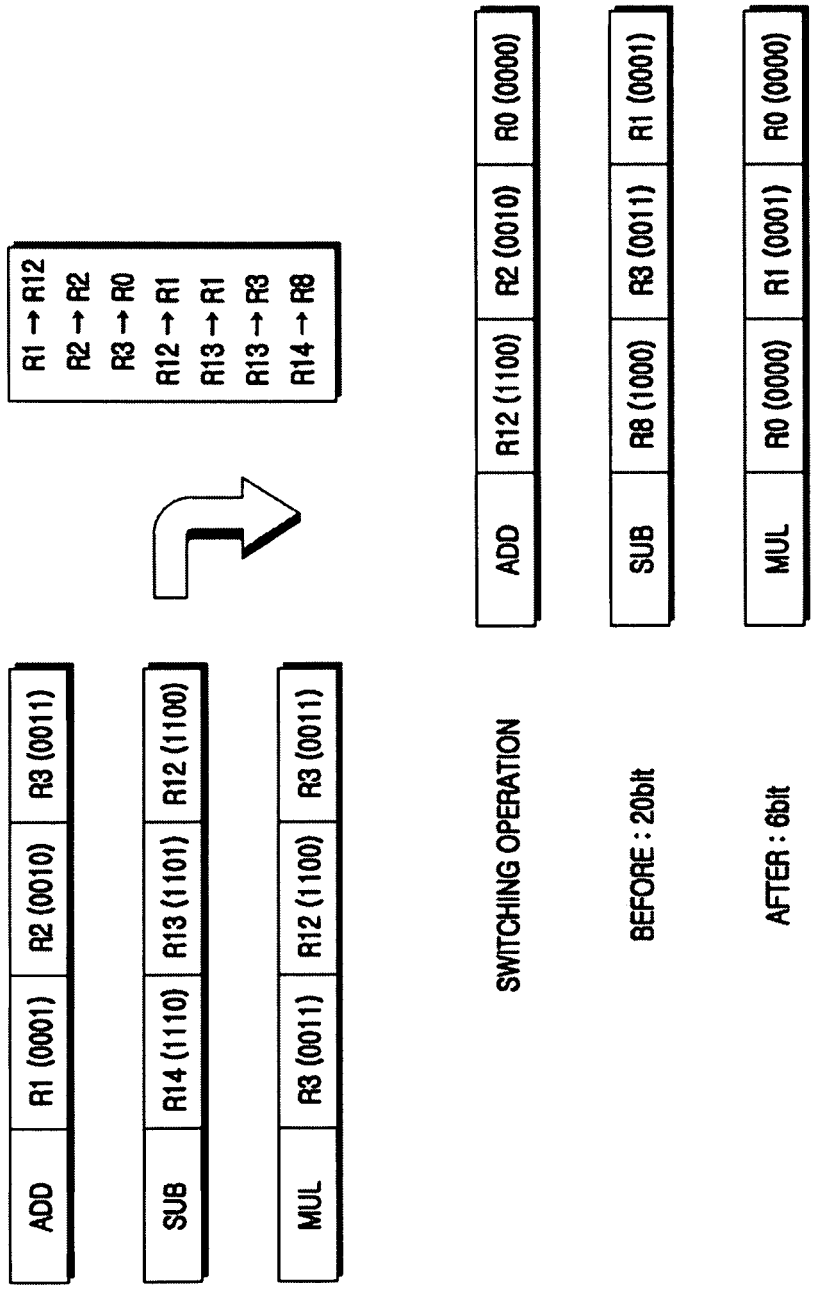
FIG. 1 is a diagram illustrating a principle of power optimization using a conventional bit switching.
Figure 2:
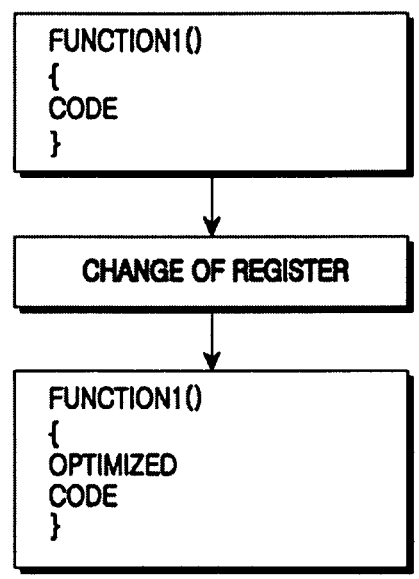
FIG. 2 is a diagram illustrating a conventional bit switching optimization scheme.
Figure 3:
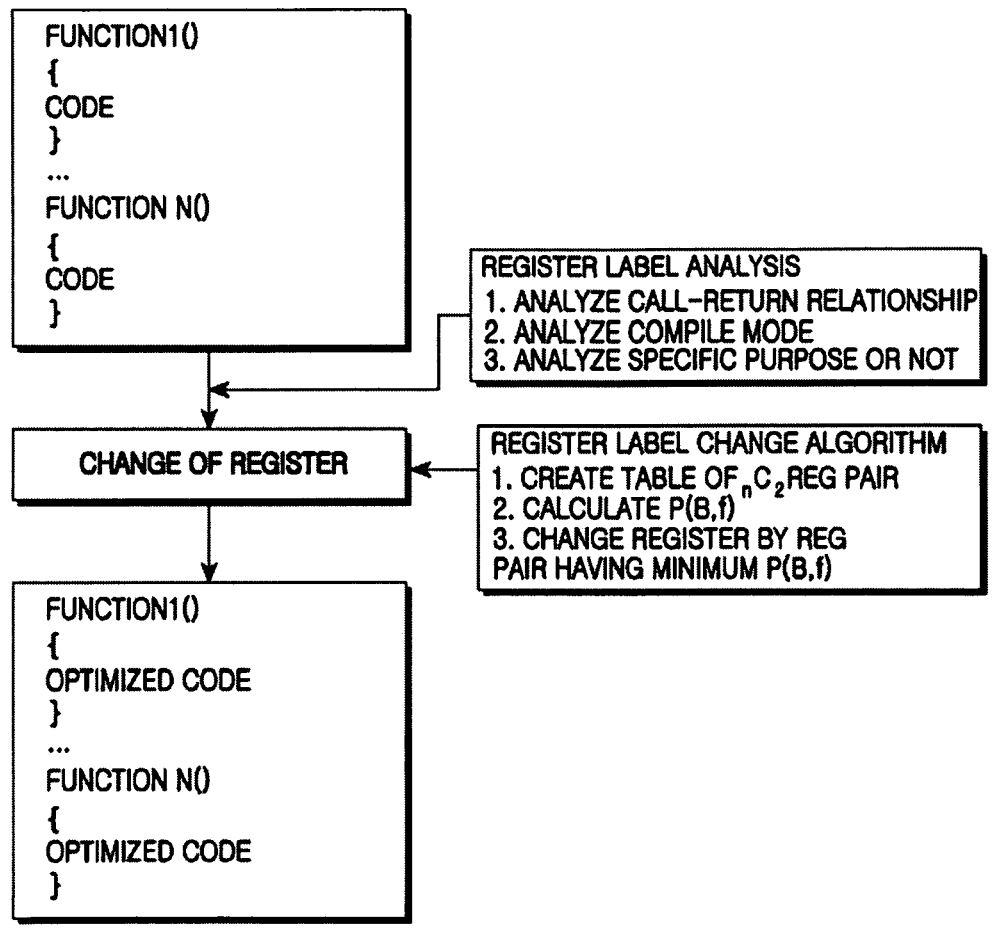
FIG. 3 is a diagram illustrating a bit switching optimization scheme according to an exemplary embodiment of the present invention.

FIG. 3 is a diagram illustrating a bit switching optimization scheme according to an exemplary embodiment of the present invention.

Referring to FIG. 3, the bit switching optimization scheme includes a register analysis process of analyzing an optimizable register, and a register change process of performing optimization for an optimizable register.

The register analysis process is a process of selecting a changeable register taking into consideration (1) a call-return relationship between functions, (2) a compile mode, and (3) the existence of a register used only for a specific purpose.

The register change process is a process of (1) creating a table that represents a changeable pair among the changeable registers selected in the register analysis process, (2) selecting a pair having the minimum bit switching frequency among the pairs, and (3) changing a register.

Figure 4:
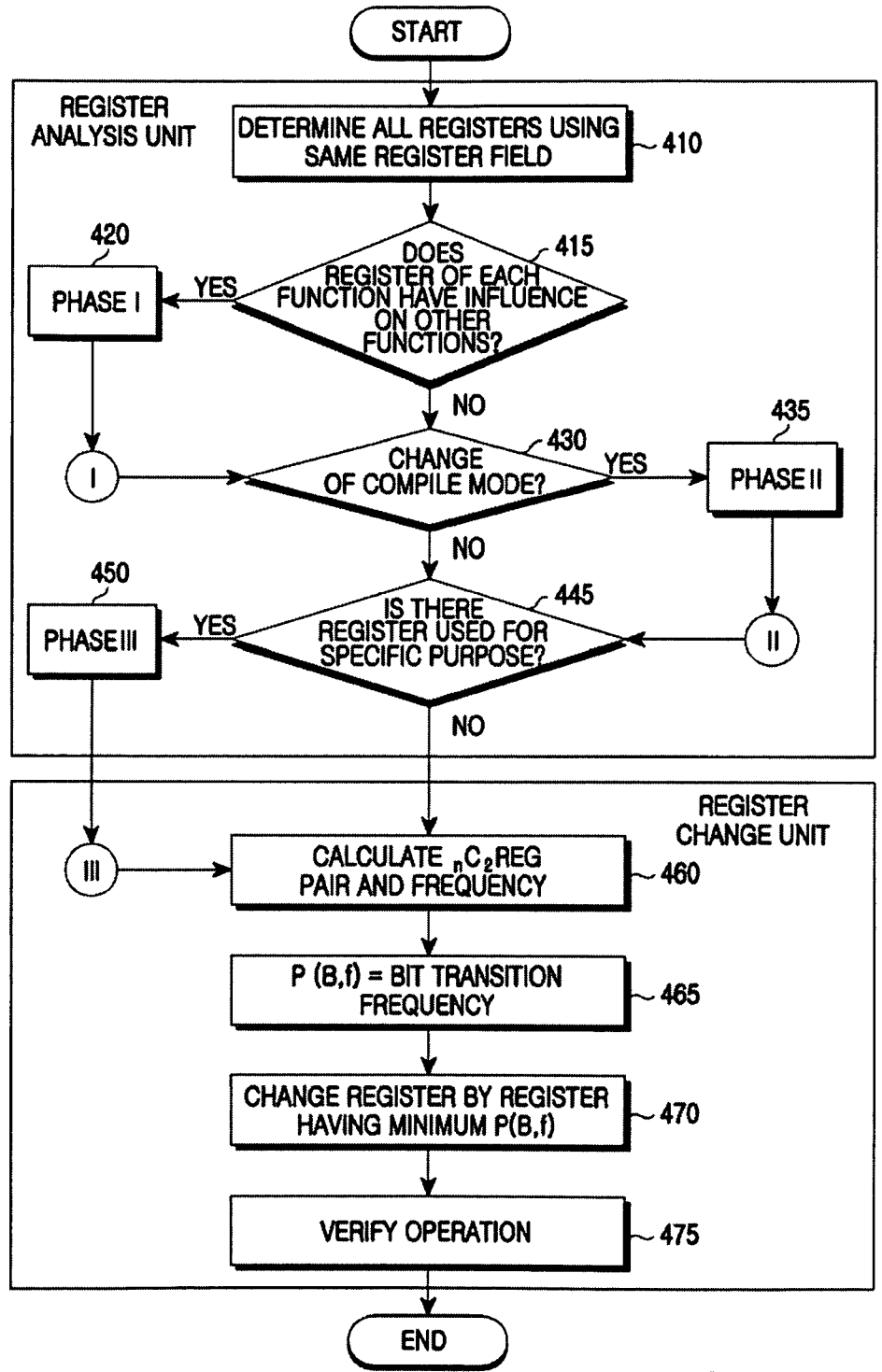
FIG. 4 is a flow diagram illustrating a process of register analysis and change according to an exemplary embodiment of the present invention.

FIG. 4 is a flow diagram illustrating a process of register analysis and change according to an exemplary embodiment of the present invention.

Referring to FIG. 4, the register analysis process may be used with assembly code. Accordingly, other types of code, such as C-language code and the like, may require a preceding process of being converted into assembly code.

The register analysis process checks the assembly code to determine which registers use the same register field in step 410.

Then, the register analysis process determines if any register used by a function of the assembly code has influence on other functions in step 415. If any register has such an influence, the register analysis process performs a PHASE 1 in step 420. If the register has no influence, the register analysis process does not perform the PHASE 1 and instead determines if there is a change of a compile mode in step 430.

If determining that a register is changeable in the PHASE 1, the register analysis process determines if there is a change of a compile mode in step 430. That is, the register analysis process determines if the compile mode is distinguished and executed for compiling.

For example, in an ARM microprocessor, a compile mode is distinguished into an ARM mode and a THUMB mode and, if compiling is performed in the THUMB mode, registers R12 to R15 are unchangeable.

If the compile mode is distinguished and executed for compiling, the register analysis process performs a PHASE 2 in step 435. If the compile mode is not distinguished and executed for compiling, the register analysis process does not perform the PHASE 2 but does determine if there is a register used for a specific purpose in step 445. Even after the PHASE 2, the register analysis process determines if there is a register used for a specific purpose in step 445.

For example, in an ARM microprocessor, when registers R0 to R3 are used as parameters of an execution function, such registers R0 to R3 are unchangeable. Also, when registers R12 to R15 are used for the below purposes, such registers R12 to R15 are unchangeable:

R12: Intra-Procedure-Call purpose,
R13: Stack Point purpose,
R14: Linked Register purpose, and
R15: Program Counter purpose.

If there is a register used for a specific purpose in step 445, the register analysis process performs a PHASE 3 in step 450.

If there is no register used for a specific purpose in step 445, the register analysis process is terminated and a register change process is performed.

After the PHASE 3, the register analysis process is terminated and the register change process is performed. The register analysis process determines a changeable register.

In other words, the PHASE 1 analyzes a call-return relationship of a function and thus determines if optimization is possible, the PHASE 2 selects an optimizable register according to a compile mode, and the PHASE 3 excludes a register used for a specific purpose.

The register change process is described below.

Initially, the register change process searches for a pair of changeable registers (Reg pair) through an $_nC_2$ (n denotes a number of verified changeable registers) operation, and analyzes its frequency for tabling in step 460.

Then, the register change process calculates a bit switching value given as "P(B, f)=Bit transition*frequency" by multiplying a bit transition value calculated from the register pairs (Reg pairs) by its generation frequency in step 465.

Then, the register change process searches for a register pair (Reg pair) giving the minimum (P(B, f)) value among the register pairs (Reg pairs) and thus, changes a register in step 470. Thereafter, the register change process may verify the operation, in step 475, by identifying one of normal and abnormal operation by determining if the register value remains the same after the register is changed.

Figure 5:
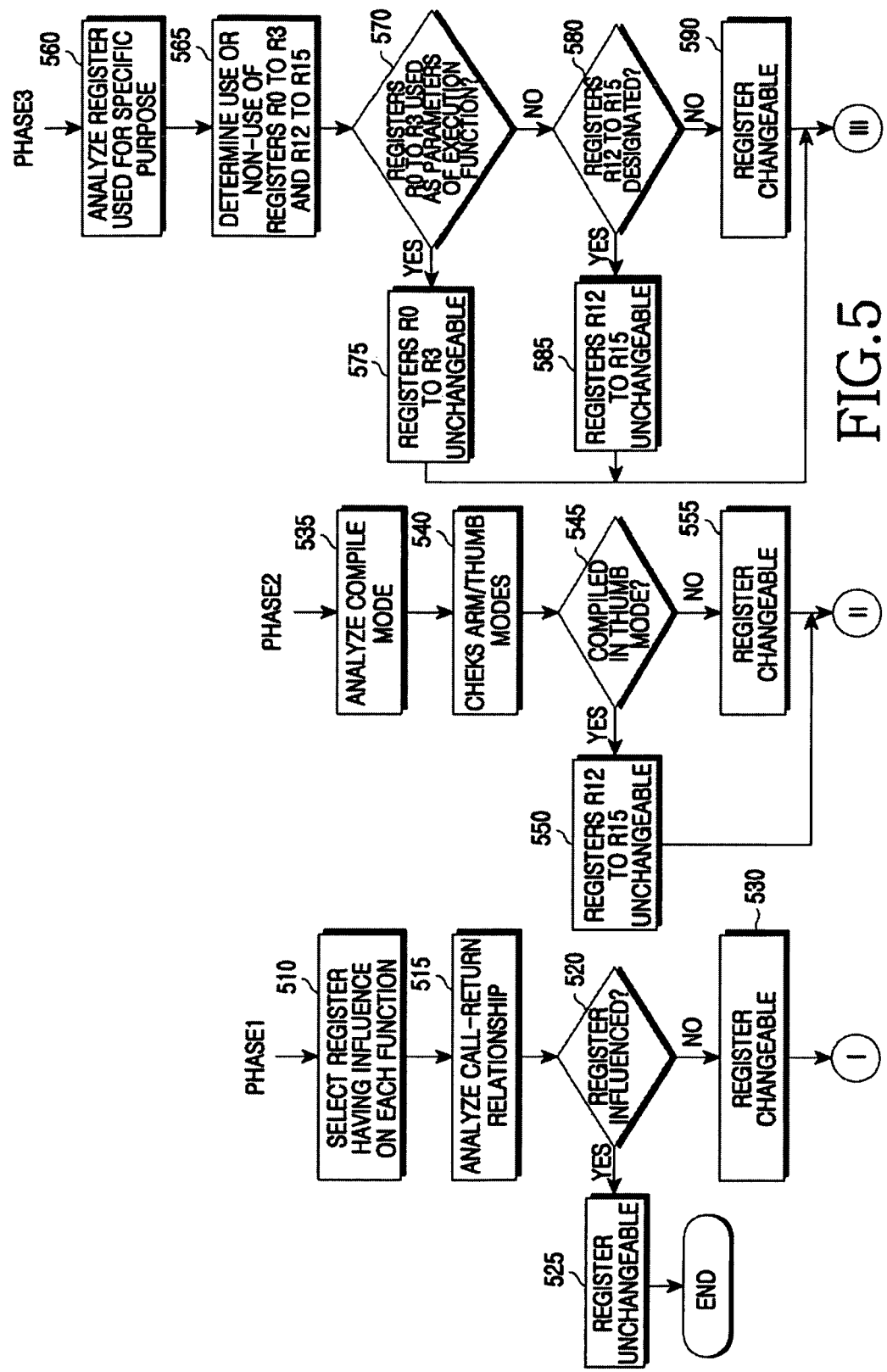
FIG. 5 is a flow diagram illustrating PHASEs 1, 2, and 3 of a register analysis process according to an exemplary embodiment of the present invention.

FIG. 5 is a flow diagram illustrating PHASEs 1, 2, and 3 of a register analysis process according to an exemplary embodiment of the present invention.

Referring to FIG. 5, the PHASE 1 selects a register having influence on a function in step 510, analyzes a call-return relationship of the function including the register in step 515, and, if the register is influenced in the call-return process in step 520, determines that a register is unchangeable in step 525. If the register is not influenced in the call-return process in step 520, the PHASE 1 determines that a register is changeable in step 530.

The PHASE 2 analyzes a compile mode in step 535 and determines which compile mode is used between ARM mode and THUMB mode in step 540.

If compiling is performed in the THUMB mode in step 545, the PHASE 2 determines that registers R12 to R15 are unchangeable in step 550. If compiling is performed in the ARM mode, not the THUMB mode, the PHASE 2 determines that the registers are changeable in step 555.

The PHASE 3 searches a register used for a specific purpose in step 560, and determines if registers R0 to R3 are used as parameters of an execution function or if registers R12 to R15 are designated to the below specific purposes in step 565:

R12: Intra-Procedure-Call purpose,
R13: Stack Pointer purpose,
R14: Linked Register purpose, and
R15: Program Counter purpose.

If it is determined that the registers R0 to R3 are used as the parameters of the execution function in step 570, the PHASE 3 determines that registers R0 to R3 are unchangeable in step 575.

If it is determined that the registers R12 to R15 are designated to specific purposes (described above) in step 580, the PHASE 3 determines that registers R12 to R15 are unchangeable in step 585.

If the registers R0 to R3 are not used as parameters of the execution function and the registers R12 to R15 are not designated, the PHASE 3 determines that the registers are changeable in step 590.

Figure 6:
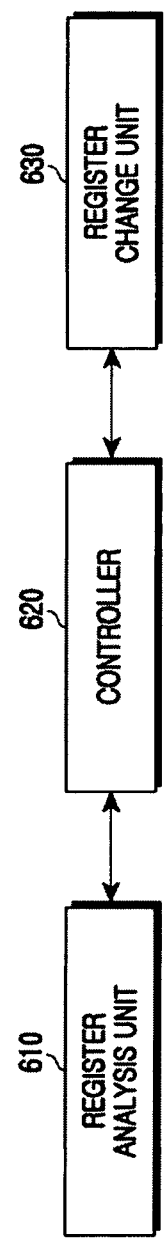
FIG. 6 is a block diagram illustrating a system for performing a register analysis process and a register change process according to an exemplary embodiment of the present invention.

FIG. 6 is a block diagram illustrating a system for performing a register analysis process and a register change process according to an exemplary embodiment of the present invention.

Referring to FIG. 6, the system includes a register analysis unit 610, a controller 620, and a register change unit 630.

The controller 620 controls general functions of the system and, in addition, controls the register analysis unit 610 and the register change unit 630.

In a description for an assembly code, the register analysis unit 610 determines all registers that use the same register field in the assembly code and determines if a register of a function of the assembly code has influence on other functions. If the register has influence, the register analysis unit 610 performs a PHASE 1. If the register has no influence, the register analysis unit 610 does not perform the PHASE 1. The register analysis unit 610 determines if there is a change of a compile mode.

If it is determined that a register is changeable in the PHASE 1, the register analysis unit 610 determines if there is a change of a compile mode. If the compile mode is distinguished and executed for compiling, the register analysis unit 610 performs a PHASE 2. If the compile mode is not distinguished and executed for compiling, the register analysis unit 610 does not perform the PHASE 2 and determines if there is a register used for a specific purpose.

If there is a register used for a specific purpose after the PHASE 2, the register analysis unit 610 performs a PHASE 3. If there is no register used for a specific purpose, the register analysis unit 610 terminates the register analysis process.

That is, the register analysis unit 610 determines a changeable register.

The register change unit 630 searches for a pair of changeable registers (Reg pair) through an $_nC_2$ (n: number of changeable registers verified) operation, analyzes its frequency for tabling, calculates a bit switching value given as "P(B, f)=Bit transition*frequency" by multiplying a bit transition value calculated from the register pairs (Reg pairs) by its generation frequency, searches the register pairs (Reg pairs) for a register pair (Reg pair) giving the minimum (P(B, f)) value and then changes a register.

The register change unit 630 traces a variation of a register value to determine if the register value is maintained before and after a change of a register during the execution of the procedure, and identifies a normal or abnormal operation.

In the aforementioned construction, the controller 620 can perform all or part of the functions of the register analysis unit 610 and the register change unit 630.

Register analysis unit 610, controller 620, and register change unit 630 are illustrated as being separately constructed and are shown in order to distinguish and describe respective functions of an exemplary embodiment of the present invention. However, the product can be constructed so that the controller 620 can process all of the functions of at least one of the register analysis unit 610 and the register change unit 630. Alternately, the product can be constructed so that the controller 620 can process only part of them.

An exemplary embodiment of the present invention has an advantage of being capable of securing extensibility and generality and realizing low power consumption, by applying a principle, which is applicable from to a single code and a single function to a code of a complex structure.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. An apparatus for reducing a bit switching frequency, the apparatus comprising:
    a register analysis unit configured to determine if registers among bit-switching targeted registers are one of changeable and unchangeable; and
    a register change unit configured to search for a register pair having a minimum bit switching frequency among registers determined to be changeable, and for changing at least one register,
    wherein the register analysis unit is configured to determine if a register has influence on one or more other functions and, if the register has influence, the register analysis unit is configured to perform a first process of determining if the register is changeable and, if the register has no influence, the register analysis unit is configured not to perform the first process.

2. The apparatus of claim 1, wherein the first process comprises:
    selecting the register having influence;
    analyzing a call-return relationship of each of the one or more functions influenced by the register;
    if the register is influenced in the call-return process, determining that the register is unchangeable; and
    if the register is not influenced in the call-return process, determining that the register is changeable.

3. The apparatus of claim 1, wherein, if there is a change of a compile mode, the register analysis unit performs a second process of selecting an optimizable register according to the compile mode and, if there is no change of the compile mode, does not perform the second process.

4. The apparatus of claim 3, wherein the second process comprises:
    analyzing the compile mode; and
    if the compile mode is a compile mode in which the register is unchangeable, determining that the register is unchangeable.

5. The apparatus of claim 3, wherein, if the register is used for a specific purpose, the register analysis unit performs a third process of excluding the register used for the specific purpose and, if the register is not used for a specific purpose, does not perform the third process.

6. The apparatus of claim 5, wherein the third process comprises:
    determining that the register used for the specific purpose is unchangeable.

7. The apparatus of claim 1, wherein, if the register is changeable, the register analysis unit selects an optimizable register according to a compile mode, and selects the register as a changeable register by excluding any registers used for a specific purpose.

8. The apparatus of claim 1, wherein the register change unit searches for a pair of changeable registers through an $_nC_2$ operation among the registers determined to be changeable, wherein n denotes a number of verified changeable registers, calculates a bit switching value given as "P(B, f)=Bit transition*frequency" by multiplying a bit transition value calculated from the register pairs by its generation frequency, and searches for a register pair giving the minimum (P(B, f)) value and changes the at least one register.

9. The apparatus of claim 1, wherein the register change unit identifies one of normal and abnormal operation by determining if the at least one register value remains the same after the at least one register is changed.

10. A method for reducing a bit switching frequency, the method comprising:
    determining, by a register analysis unit, if registers among bit-switching targeted registers are one of changeable and unchangeable;
    searching, by a register change unit, a register pair having a minimum bit switching frequency among the one or more registers determined to be changeable; and
    changing, by the register change unit, at least one register,
    wherein the determining if the registers among the bit-switching targeted registers are one of changeable and unchangeable comprises:
    determining, by the register analysis unit, if a target register has influence on one or more other functions;
    if the register has influence, performing, by the register analysis unit, a first process of determining if the register is changeable; and
    if the register has no influence, not performing, by the register analysis unit, the first process.

11. The method of claim 10, wherein the first process comprises:
    selecting the register having an influence;
    analyzing a call-return process of each of the one or more functions influenced by the register;
    if the register is influenced in the call-return process, determining that the register is unchangeable; and
    if the register is not influenced in the call-return process, determining that the register is changeable.

12. The method of claim 10, wherein the determining if the registers among the bit-switching targeted registers are one of changeable and unchangeable comprises:
    if there is a change of a compile mode, performing a second process of selecting an optimizable register according to the compile mode; and
    if there is no change of the compile mode, not performing the second process.

13. Method of claim 12, wherein the second process comprises:
    analyzing the compile mode; and
    if the compile mode is a compile mode in which the register is unchangeable, determining that the register is unchangeable.

14. The method of claim 12, wherein the determining if the registers among the bit-switching targeted registers are one of changeable and unchangeable comprises:
    if the register is used for a specific purpose, performing a third process of excluding the register used for the specific purpose; and
    if the register is not used for a specific purpose, not performing the third process.

15. The method of claim 14, wherein the third process determines that the register used for the specific purpose is unchangeable.

16. The method of claim 10, wherein the determining if the registers among the bit-switching targeted registers are one of changeable and unchangeable comprises:
    if the register is changeable, selecting an optimizable register according to the compile mode; and
    selecting the register as a changeable register by excluding any registers used for a specific purpose.

17. The method of claim 10, wherein the changing of the at least one register comprises:
    performing an $_nC_2$ operation among the registers determined to be changeable, wherein n denotes a number of verified changeable registers;
    searching for a pair of changeable registers;
    calculating a bit switching value given as "P(B, f)=Bit transition*frequency" by multiplying a bit transition value calculated from the register pairs by its generation frequency;
    searching for a register pair giving the minimum (P(B, f)) value; and
    changing the at least one register.

18. The method of claim 10, wherein the changing of the at least one register comprises:
    identifying one of normal and abnormal operation by determining if the at least one register value remains the same after the at least one register is changed.

* * * * *